United States Patent
Hampel et al.

(10) Patent No.: US 9,215,283 B2
(45) Date of Patent: Dec. 15, 2015

(54) SYSTEM AND METHOD FOR MOBILITY AND MULTI-HOMING CONTENT RETRIEVAL APPLICATIONS

(75) Inventors: K. Georg Hampel, New York, NY (US); Thierry E. Klein, Fanwood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/249,314

(22) Filed: Sep. 30, 2011

(65) Prior Publication Data

US 2013/0086142 A1    Apr. 4, 2013

(51) Int. Cl.
| | |
|---|---|
| G06F 11/07 | (2006.01) |
| G06F 15/16 | (2006.01) |
| H04L 29/06 | (2006.01) |
| H04L 29/08 | (2006.01) |
| H04W 36/00 | (2009.01) |

(52) U.S. Cl.
CPC .............. *H04L 67/148* (2013.01); *H04L 29/06* (2013.01); *H04W 36/0011* (2013.01); *H04L 67/06* (2013.01); *H04L 67/101* (2013.01); *H04L 67/1002* (2013.01)

(58) Field of Classification Search
None
See application file for complete search history.

(56) References Cited

U.S. PATENT DOCUMENTS

| | | | |
|---|---|---|---|
| 6,041,357 A | 3/2000 | Kunzelman et al. | |
| 6,377,996 B1 | 4/2002 | Lumelsky et al. | |
| 6,957,374 B1 * | 10/2005 | Redeske | 714/748 |
| 7,257,386 B1 * | 8/2007 | McDonnell et al. | 455/403 |
| 7,761,098 B1 * | 7/2010 | Nguyen et al. | 455/435.2 |
| 8,046,432 B2 * | 10/2011 | Yoo et al. | 709/217 |
| 8,447,299 B1 * | 5/2013 | Nguyen et al. | 455/435.2 |
| 8,493,931 B1 * | 7/2013 | Nix | 370/331 |
| 2002/0026645 A1 * | 2/2002 | Son et al. | 725/117 |
| 2002/0049853 A1 * | 4/2002 | Chu et al. | 709/237 |
| 2002/0087654 A1 * | 7/2002 | Feigenbaum | 709/214 |
| 2002/0142780 A1 * | 10/2002 | Airy et al. | 455/452 |
| 2002/0194205 A1 * | 12/2002 | Brown et al. | 707/200 |
| 2003/0114158 A1 * | 6/2003 | Soderbacka et al. | 455/436 |
| 2003/0206551 A1 * | 11/2003 | Naim et al. | 370/401 |
| 2004/0085944 A1 * | 5/2004 | Boehm | 370/338 |
| 2004/0156329 A1 * | 8/2004 | Bck et al. | 370/328 |

(Continued)

FOREIGN PATENT DOCUMENTS

| | | |
|---|---|---|
| JP | 2002-330381 A | 11/2002 |
| JP | 2004-007327 A | 1/2004 |
| JP | 2004-265354 A | 9/2004 |

OTHER PUBLICATIONS

The International Search Report and the Written Opinion of the International Searching Authority, or the Declaration in PCT/US2012/054588, Alcatel Lucent, Applicant, 9 pages.

(Continued)

*Primary Examiner* — Ario Etienne
*Assistant Examiner* — Ho Shiu
(74) *Attorney, Agent, or Firm* — Wall & Tong, LLC (57) ABSTRACT

A controller function residing underneath a client application in a TCP/IP stack or session layer monitors state and status information associated with session-based application layer functions (e.g., content retrieval) and uses this information to migrate one or more sessions from a first client interface to a second client interface (e.g., 3G, 4G, LTE, 802.11x, WiMAX) and to a different application function serving entity (e.g., a different content server, cache server, service provider).

19 Claims, 7 Drawing Sheets

(56) References Cited

U.S. PATENT DOCUMENTS

| | | | |
|---|---|---|---|
| 2004/0196867 A1* | 10/2004 | Ejzak et al. | 370/468 |
| 2005/0059398 A1* | 3/2005 | Jaupitre et al. | 455/435.2 |
| 2005/0215246 A1* | 9/2005 | Soderbacka et al. | 455/426.1 |
| 2006/0078006 A1* | 4/2006 | Fischer et al. | 370/522 |
| 2006/0104262 A1* | 5/2006 | Kant et al. | 370/352 |
| 2006/0126646 A1* | 6/2006 | Bedingfield | 370/401 |
| 2006/0129631 A1* | 6/2006 | Na et al. | 709/203 |
| 2006/0159047 A1* | 7/2006 | Olvera-Hernandez et al. | 370/331 |
| 2006/0229078 A1* | 10/2006 | Itzkovitz et al. | 455/445 |
| 2006/0234678 A1* | 10/2006 | Juitt et al. | 455/411 |
| 2006/0258356 A1* | 11/2006 | Maxwell et al. | 455/436 |
| 2006/0276192 A1* | 12/2006 | Dutta et al. | 455/436 |
| 2006/0276193 A1* | 12/2006 | Itzkovitz et al. | 455/445 |
| 2007/0155420 A1* | 7/2007 | Nagaraj et al. | 455/552.1 |
| 2008/0009324 A1* | 1/2008 | Patel | 455/566 |
| 2008/0126831 A1* | 5/2008 | Downey et al. | 714/4 |
| 2008/0130637 A1* | 6/2008 | Kant et al. | 370/389 |
| 2008/0160908 A1* | 7/2008 | Khedouri et al. | 455/3.06 |
| 2008/0200168 A1* | 8/2008 | Jiang | 455/432.1 |
| 2008/0293431 A1* | 11/2008 | Buerger et al. | 455/456.1 |
| 2008/0304458 A1* | 12/2008 | Aghvami et al. | 370/338 |
| 2008/0311909 A1* | 12/2008 | Taaghol et al. | 455/436 |
| 2009/0052450 A1* | 2/2009 | Mockett | 370/390 |
| 2009/0156215 A1* | 6/2009 | Pitkamaki | 455/437 |
| 2009/0172138 A1* | 7/2009 | Wang et al. | 709/223 |
| 2009/0216725 A1* | 8/2009 | Yaqub | 707/3 |
| 2009/0232149 A1* | 9/2009 | Bedingfield, Sr. | 370/401 |
| 2009/0249057 A1* | 10/2009 | Lerner et al. | 713/2 |
| 2009/0316693 A1* | 12/2009 | Itzkovitz et al. | 370/352 |
| 2010/0075680 A1* | 3/2010 | Ramachandran et al. | 455/436 |
| 2010/0087225 A1* | 4/2010 | Nagaraj et al. | 455/552.1 |
| 2010/0220665 A1* | 9/2010 | Govindan et al. | 370/329 |
| 2010/0265884 A1* | 10/2010 | Vikberg et al. | 370/328 |
| 2010/0281112 A1* | 11/2010 | Plamondon | 709/203 |
| 2010/0315958 A1* | 12/2010 | Luo et al. | 370/248 |
| 2010/0329209 A1* | 12/2010 | Akselsen | 370/331 |
| 2011/0019620 A1* | 1/2011 | Wang | 370/328 |
| 2011/0040867 A1* | 2/2011 | Kalbag | 709/224 |
| 2011/0064058 A1* | 3/2011 | Rimoni et al. | 370/332 |
| 2011/0170433 A1* | 7/2011 | Scobbie | 370/252 |
| 2011/0182221 A1* | 7/2011 | Arakawa | 370/311 |
| 2011/0188451 A1* | 8/2011 | Song et al. | 370/328 |
| 2011/0225312 A1* | 9/2011 | Liu et al. | 709/231 |
| 2011/0246502 A1* | 10/2011 | Aguera y Arcas et al. | 707/769 |
| 2011/0268027 A1* | 11/2011 | Nogawa | 370/328 |
| 2011/0280228 A1* | 11/2011 | McCann et al. | 370/338 |
| 2011/0299494 A1* | 12/2011 | Casey et al. | 370/329 |
| 2011/0319073 A1* | 12/2011 | Ekici et al. | 455/426.1 |
| 2012/0002638 A1* | 1/2012 | Huh | 370/331 |
| 2012/0002815 A1* | 1/2012 | Wei et al. | 380/270 |
| 2012/0005746 A1* | 1/2012 | Wei et al. | 726/15 |
| 2012/0052859 A1* | 3/2012 | Cai et al. | 455/426.1 |
| 2012/0072228 A1* | 3/2012 | Pankajakshan et al. | 705/1.1 |
| 2012/0140651 A1* | 6/2012 | Nicoara et al. | 370/252 |
| 2012/0226896 A1* | 9/2012 | Lerner et al. | 713/2 |
| 2012/0270551 A1* | 10/2012 | Hu | 455/436 |
| 2012/0324568 A1* | 12/2012 | Wyatt et al. | 726/13 |

OTHER PUBLICATIONS

Office Action received in corresponding Japanese Application No. 2014-533564, dated Feb. 10, 2015, pp. 1-7.

Office Action received in corresponding Korean Application No. 2014-7008171, dated Apr. 15, 2015, pp. 1-3.

* cited by examiner

SYSTEM AND METHOD FOR MOBILITY AND MULTI-HOMING CONTENT RETRIEVAL APPLICATIONS

FIELD OF THE INVENTION

The invention relates generally to multi-homed or mobile hosts and, more specifically but not exclusively, to providing seamless session migration of content retrieval as such hosts transition between communication networks.

BACKGROUND

A mobile or multi-homed host may have to change its Layer 3 network access point (i.e., IP address) while running a content retrieval session, e.g. while the client is retrieving data from a remote server. Such an interface change may be desirable because the "new" interface has higher link quality or encounters lower network congestion than the "old" interface. The interface may also have to change when the user moves from the coverage area of one network to that of another.

For the client's new interface, a different server may be better suited to deliver the data than the server sending the data to the host's old interface. This may be due to the closer proximity of the new server to the client's new interface. It is also possible that the network connecting to one of the interfaces holds an application layer proxy but the network supporting the other interface does not hold such a proxy, or it holds a different proxy. While such proxy information may be pre-configured on the mobile/multi-homed host, the remote address used for content retrieval has to change when the interface changes.

For at least these reasons, it is desirable to provide capabilities to change the server delivering the content together with the interface used by the client for content retrieval.

Content retrieval applications typically use stream-oriented transport protocols such as TCP, SCTP or MPTCP, which connect the client to the content server and ensure reliable and in-order delivery of the content. When TCP is used as the underlying transport protocol, the transport connection cannot be migrated to a different interface without disrupting the superseding client-server session. When SCTP is used, the client can migrate the traffic flow from the old to the new interface. However, it is not possible to change the server at the same time, since the SCTP control block on the old server holds connection-specific information which is not shared with the new server. The same problem arises if MPTCP is used for the connection. Further, SCTP and MPTCP are not generally supported on the Internet.

There are several mobility/multi-homing protocols that accommodate the functionality of session endpoint migration on layer 3 and are therefore transparent to transport and application layers. Examples are Mobile IP protocol family, SHIM6 and LTE. Some of these solutions require additional network nodes such as home agents or specialized gateways (MIPv4, MIPv6, DSMIP, PMIP, LTE). Unfortunately, none of these solutions permits the content server to be changed during ongoing data retrieval.

There are proposals referred to as content-centric networks (e.g. Jacobson et al., "Networking Named Content", CoNEXT '09, Proceedings of the Fifth International Conference on Emerging Networking Experiments and Technologies), which permit mobility/multi-homing and content-source migration during a content-retrieval session. These proposals, however, are not compliant with the present IP-layer and transport-layer protocols. For the same reason, they are further not compliant with the existing network infrastructure or Internet.

Application-layer solutions exist wherein attachment-point changes and server changes are built into the client application itself. Such applications can stop the data transfer midway, terminate the corresponding transport connection, re-establish a new transport connection and request the remaining data from the same or from a new server. While these solutions may be tailored to the specific application layer protocol as well as the data type of the content, they need to be implemented by every client application separately. This is very cumbersome and, inherently, does not support existing or legacy applications.

Unfortunately, while several content retrieval techniques exist to change the server delivering the content and/or the interface used by the client for content retrieval, none of these techniques is capable of supporting existing client applications while maintaining compliance with existing and evolving transport protocols.

SUMMARY

Various deficiencies in the prior art are addressed by embodiments enabling substantially continuous content retrieval by a multi-homed or mobile host to change its interface as well as the content server used by a client session during content retrieval without disrupting the content retrieval session on the client In various embodiments, a controller function is implemented which resides underneath the client application in the TCP/IP stack or on session layer. The controller function monitors various commands used by the application layer protocol to maintain state and status information associated with application layer functions (e.g., content retrieval), such that the application layer functions may be migrated to a different client interface (e.g., 3G, 4G, LTE, 802.11x, WiMAX) and or different application function serving entity (e.g., a different content server, cache server, service provider).

In one embodiment, an apparatus for migrating a content retrieval session associated with a content retrieval application at a host from a first server via a first interface to a second server via a second interface comprises a processor configured to establish a transport connection to the second server using the second interface; transmit a content request message to the second server via the second interface, the content request message including an identifier associated with content to be retrieved and an indication of content portions received by the content retrieval application; analyze a content bearing data stream received via the second interface to identify further content portions received by the content retrieval application; and forward, toward the content retrieval application, identified content portions not received by the content retrieval application.

In another embodiment, a method for migrating a content retrieval session associated with a content retrieval application at a host from a first server via a first interface to a second server via a second interface comprises establishing a transport connection to the second server using the second interface; transmitting a content request message to the second server via the second interface, the content request message including an identifier associated with content to be retrieved and an indication of content portions received by the content retrieval application; analyzing a content bearing data stream received via the second interface to identify further content portions received by the content retrieval application; and forwarding, toward the content retrieval application, identified content portions not received by the content retrieval application.

In various embodiments, a controller function residing underneath a client application in a TCP/IP stack or session layer monitors state and status information associated with session-based application layer functions (e.g., content retrieval) and uses this information to migrate one or more sessions from a first client interface to a second client interface (e.g., 3G, 4G, LTE, 802.11x, WiMAX) and to a different application function serving entity (e.g., a different content server, cache server, service provider).

BRIEF DESCRIPTION OF THE DRAWINGS

The teachings herein may be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

A generalized capability enabling multi-homed or mobile hosts to change the server delivering content, along with the interface used by the client, in a manner transparent to a content retrieval application is depicted and described herein, although it is noted that various other related and/or unrelated capabilities also may be disclosed.

Various embodiments support existing client applications within multi-homed or mobile hosts to change the server delivering content together with the interface used by the client for content retrieval while maintaining compliance with existing and evolving transport protocols.

Various embodiments are applicable to mobile and/or multi-homed hosts which use applications for content retrieval from servers residing on a network. Examples for such content retrieval sessions include downloads from webservers such as conducted during web browsing sessions, web-based video streaming sessions, HTTP-based file transfer sessions and other non-stateful content retrieval sessions. The embodiments allow a host to transparently change the network interface as well as the content-delivering server while keeping data delivery to the client application ongoing, i.e. without disrupting or restarting the application.

The embodiments provide a safe and idempotent method invocation used by the client application that supports an offset feature, and which instructs the remote server to start content delivery with a specified offset with respect to, illustratively, the beginning of the content.

In one embodiment, content retrieval is based on the Hypertext Transfer Protocol (HTTP) protocol, and the client uses the GET method to invocate the content retrieval session. The HTTP protocol supports such an offset feature. For HTTP, the RANGE command may be used which has to be inserted into the HTTP request header together with the amount of octets of content that have already been received.

Figure 1:
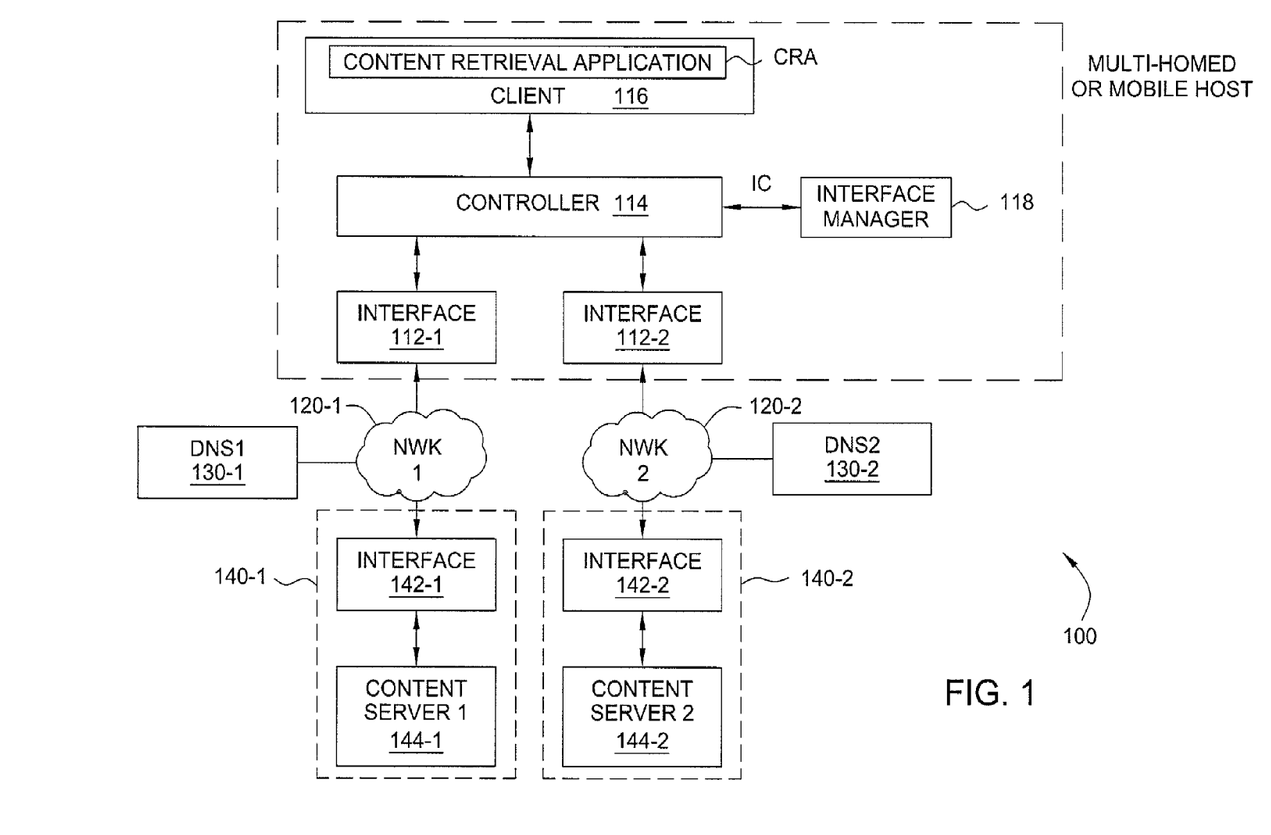
FIG. 1 depicts a high-level block diagram of a communication system including a host device according to one embodiment.

FIG. 1 depicts a high-level block diagram of a communication system including a host device according to one embodiment. Specifically, FIG. 1 depicts a system 100 in which a multi-homed or mobile host 110 is capable of communicating with a plurality of networks 120 to retrieve therefrom content from respective content sources 140.

According to various embodiments discussed herein, the host 110 is capable of transitioning a session for retrieving content from a server associated with a first network to a session for retrieving the content from a server associated with a second network without restarting the content distribution or otherwise disturbing a host content retrieval application.

The host 110 comprises, illustratively, a first interface 112-1 for interfacing with a first network 120-1, a second interface 112-2 for interfacing with a second network 120-2, a controller 114, a client 116 and an interface manager 118.

The client 116 is depicted as including a content retrieval application (CRA), which application is used to provide all necessary interactions and signaling to establish sessions with remote entities such as content servers, request the delivery of desired content from the content servers, receive the delivered content and propagate the received content toward presentation circuitry (not shown) and/or storage devices (not shown) associated with the host 110.

The controller 114 is logically situated between the client 116 and interfaces 112. In various embodiments, the controller 114 monitors some or all of the control signals and/or data traffic propagated between the client 116 and interfaces 112. The controller 114 is responsive to the interface manager 118 to adapt the use of the interfaces 112 by the client 116. In general, the operation of the controller 114 is not visible to the client 116. In various embodiments, the interface manager 118 causes the controller 114 to cause control signals and/or data traffic to flow only via the first interface 112-1, only via the second interface 112-2 or via some combination of the first and second interfaces 112.

The interface manager 118 causes the controller 114 to select which of the interfaces 112 will be used to support control signals and/or data traffic between the client 116 and interfaces 112. The interface manager 118 is depicted as communicating with the controller 114 via an interface control (IC) signal path.

In some embodiments, the IC signal path is unidirectional in that the interface manager expresses which of the available interfaces 112 should be selected by the controller 114 for use by the client 116.

In some embodiments, the IC signal path is bidirectional in that the interface manager 118 and controller 114 communicate with each other to transmit information useful in understanding client requirements, interface requirements, condition of the interfaces 112, condition of the communication networks 120 and so on. Similarly, the interface manager 118 may communicate conditional trigger conditions which, when sensed by the controller 114 as having occurred, result in the controller 114 selecting a new interface 112 or performing some other function.

In various embodiments, the conditions associated with the selection of a particular interface 112 are communicated to the interface manager 118 via the controller 114. In various embodiments, such conditions are provided by a network management system (NMS), a service provider or some other entity operatively connected to the host via one or more of the interfaces 112. For example, congestion information associated with each of the networks 120 may be communicated to the controller 114 and/or interface manager 118 via respective interfaces 112.

Other conditions include preferences associated with network providers, hotspot identification information identifying "free" hot spots associated with a particular mobile network provider and so on. For example, in the case of a host 110 capable of accessing both 3G and 802.11 by respective interfaces 112, some hotspots may be free or less costly to use, depending upon service level agreements, inter-provider agreements and the like.

Thus, in various embodiments, the control signal propagated to the controller 114 by the interface manager 118 may be associated with one or more of a congestion level indicator received via the first interface, a congestion level indicator received via the second interface, a determination that a preferred service provider is associated with the second interface, a determination that a preferred server is associated with the second interface, a determined that a reduced cost is associated with the second interface, a determination that a performance increase is associated with the second interface, a determination that a preferred network is associated with the second interface, and so on.

In various embodiments, interface selection conditions may be used by one or both of the controller 114 and interface manager 118 to make a determination as to which of the interfaces 112 will be used by the client 116, such as for retrieving content within the context of a content retrieval session initiated and/or managed by the content retrieval application CRA.

It will be appreciated that while two interfaces 112 are depicted herein, three or more interfaces 112 may also be utilized within the context of the various embodiments. Each of the interfaces 112 enables communication with the corresponding network 120.

Each of the networks 120 comprises one or more access networks, core networks and so on sufficient to enable communications between the host 110 and a content source 140. Each of the networks 120 is depicted as being associated with a respective domain name server (DNS) 130, though additional domain name servers may be used within the context of anyone network 120.

Each of the content sources 140 is depicted as comprising an interface 142 for communicating with a respective network 120, and a content server 144 generally adapted to establishing sessions with, interacting with, to providing content to the client 116. The content server 140 may comprise any type of content server or content distribution system capable of session-based content distribution and or streaming.

In one embodiment, the host comprises a smart phone or other mobile device configured to communicate with wireless mobile networks via the first interface 112-1 and wireless "hotspots" by the second interface 112-2. Specifically, in this embodiment, the first interlace 112-1 may be configured to include the hardware and software components necessary to communicate with a first communications network 120-1 (illustratively a 3G, 4G, LTE or other wireless mobile/access network), while the second interface 112-2 may be configured to include the hardware and software components necessary to communicate with a second communications network 120-2 (illustratively a wireless "hotspot" type of network, such as a 802.11x, WiMAX, wireless gigabit or other similar or fixed wireless network).

While omitted for clarity, it will be appreciated that the various functions associated with the host 110, networks 120, domain name servers 130 and content sources 140 generally comprise computer-based functions implemented in hardware, software or a combination of hardware and software within the context of the host 110. Thus, the host 110 includes general computing elements such as one or more processors, memory elements, input-output circuits and the like, which elements are omitted in FIG. 1 to enhance clarity. An embodiment of a computing device providing such elements is described in more detail below with respect to FIG. 6.

The various embodiments discussed herein permit a mobile/multi-homed host to change its interface as well as the content server used by a client session during content retrieval without disrupting the content retrieval session on the client.

In various embodiments, the controller 114 comprises a software function implemented within a software layer underneath the software layer supporting the client. Specifically, the controller function resides underneath the client application in the TCP/IP stack or on session layer. The controller function monitors at least some of the traffic through its respective layer and is capable of recognizing or understanding at least some of the commands used by the application layer protocol.

Generally speaking, the controller 114 performs four primary tasks: (1) monitoring traffic between the client 116 and interface 112 to derive therefrom the identification of requested content, and the amount of requested content received by the client; (2) identifying a server on a newly selected interface including the requested content; (3) initiating a transfer connection to the identified server; and (4) redirecting to the client that portion of the content not yet received by the client.

Specifically, when the client host's interface is to be changed, the controller determines the most appropriate server to be used for this content on the new interface. The server providing content via the old interface is denoted as the "old" server, while the server selected to provide content via the new interface is denoted as the "new" server. It is noted that the new server and old server may be identical to each other, depending upon the configuration of the content provider equipment.

The controller function initiates a transport connection to the new server and sends a copy of, illustratively, the original content retrieval request to the new server.

The controller function also sends to the new server a command provided by, illustratively, the application layer protocol, which command instructs the new server to start content delivery according to a specified offset, which offset is based upon the amount of data already received via the prior interface.

The controller then redirects the data delivered by the new server to the client application and terminates the connection to the old server.

These steps are generally transparent to the client application, thereby facilitating a seamless transition of a retrieved content stream from a first network interface to a second network interface.

For the offset, any representation may be used that (1) sufficiently characterizes the amount of content received, (2) is compliant with the application layer protocol and, therefore, understood by the server, and (3) may be derived by monitoring received content stream(s).

The offset may comprise a number which refers to the amount of octets of content received. It may comprise a list of identifiers to data objects received, where the objects are provided via a standardized format (e.g., XML, html, etc.). The offset may refer to other metrics, such as a time interval associated with a received video stream or portions thereof, a frame count, a program clock reference (PCR) and the like.

Figure 2:
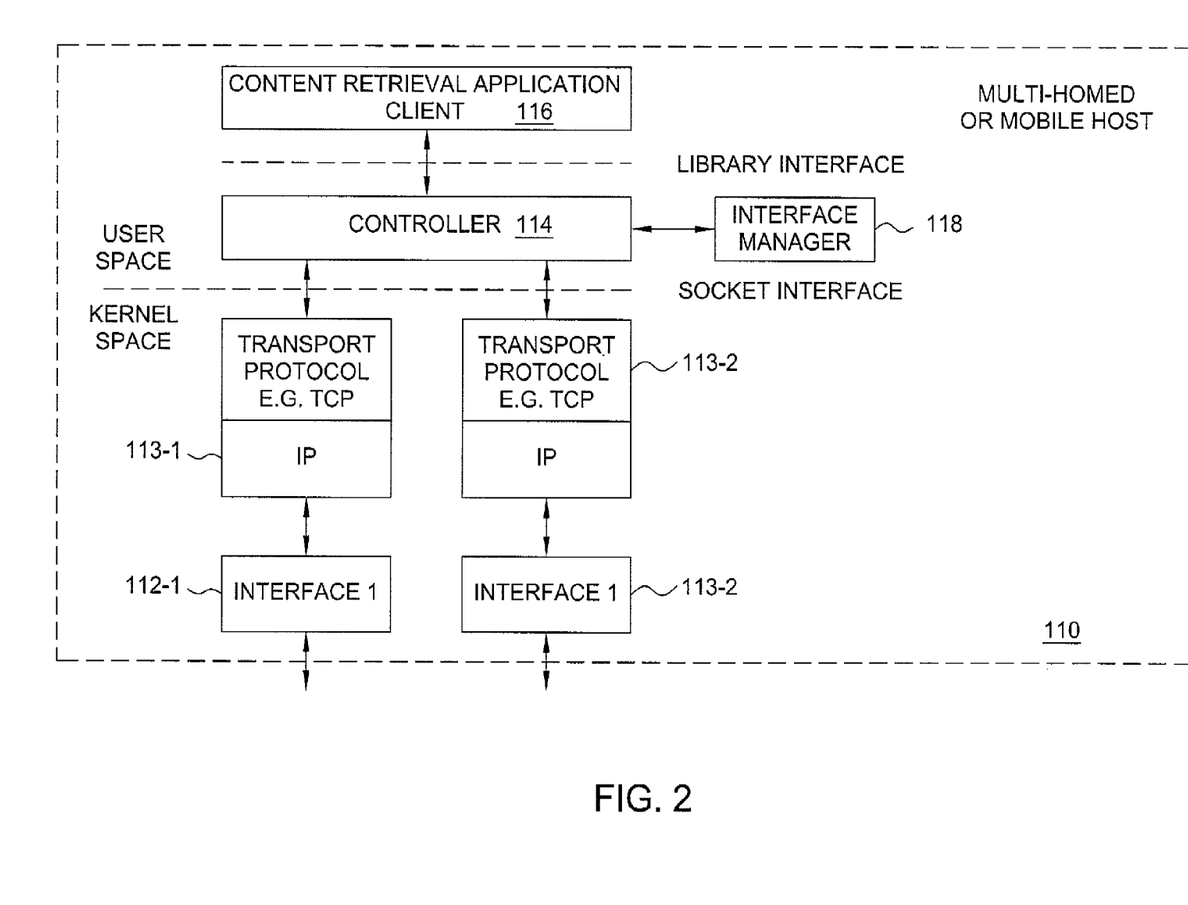
FIGS. 2-3 depict high-level block diagrams of host devices suitable for use in the communication system of FIG. 1.
Figure 3:
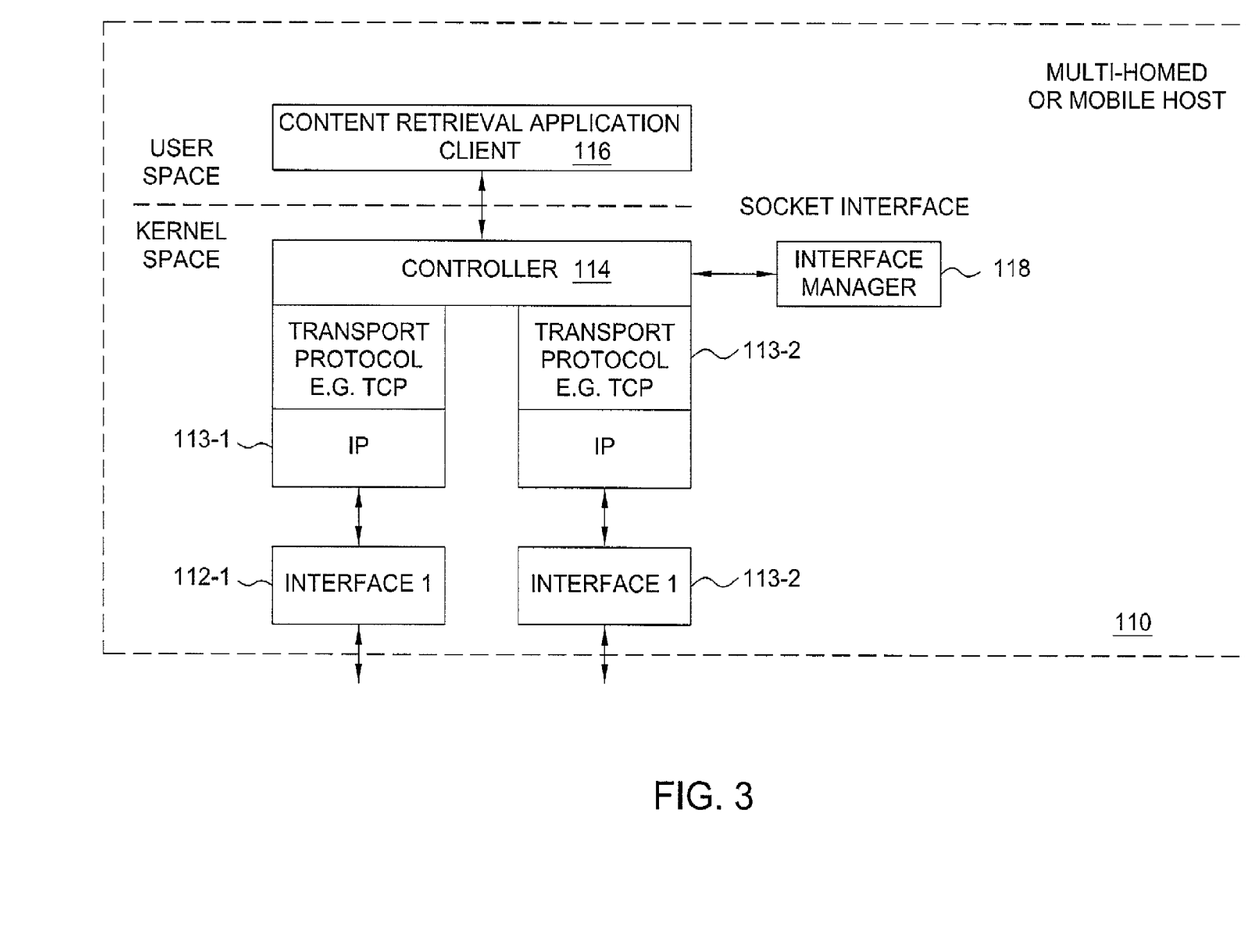

FIGS. 2-3 depict high-level block diagrams of host devices suitable for use in the communication system of FIG. 1. Specifically, FIGS. 2-3 depict hosts 110 that operate in a similar manner to the host 110 described above with respect to FIG. 1.

With respect to FIG. 2, a session layer implementation is provided using a library function such that the functions of the controller 114 are implemented within a library of functions called or accessed via the client 116. Further, kernel space includes a first TCP/IP stack 113-1 associated with the first interface 112-1, and a second TCP/IP stack 113-2 called or accessed by the controller 114.

Advantageously, this implementation provides a mechanism by which existing applications on existing multi-homed or mobile hosts may be upgraded to support the functionality of the various embodiments described herein by upgrading the library function to include the functionality of the controller 114 and interface manager 118. Unfortunately, for those applications that bypass library functions by directly accessing kernel space functions, it may not be possible to implement some of the controller functions associated with the various embodiments.

With respect to FIG. 3, a transport layer implementation is provided by including the controller 114 and interface manager 118 within kernel space, and further integrating the controller 114 with the TCP/IP stacks 113. Advantageously, this implementation provides a mechanism by which existing applications on existing multi-homed or mobile hosts were even applications that do not use the libraries, application programming interfaces (APIs) and so on associated with the library function will still be able to operate according to the various embodiments described herein since kernel space functions cannot be bypassed by applications as easily as user space functions such as library functions.

Figure 4:
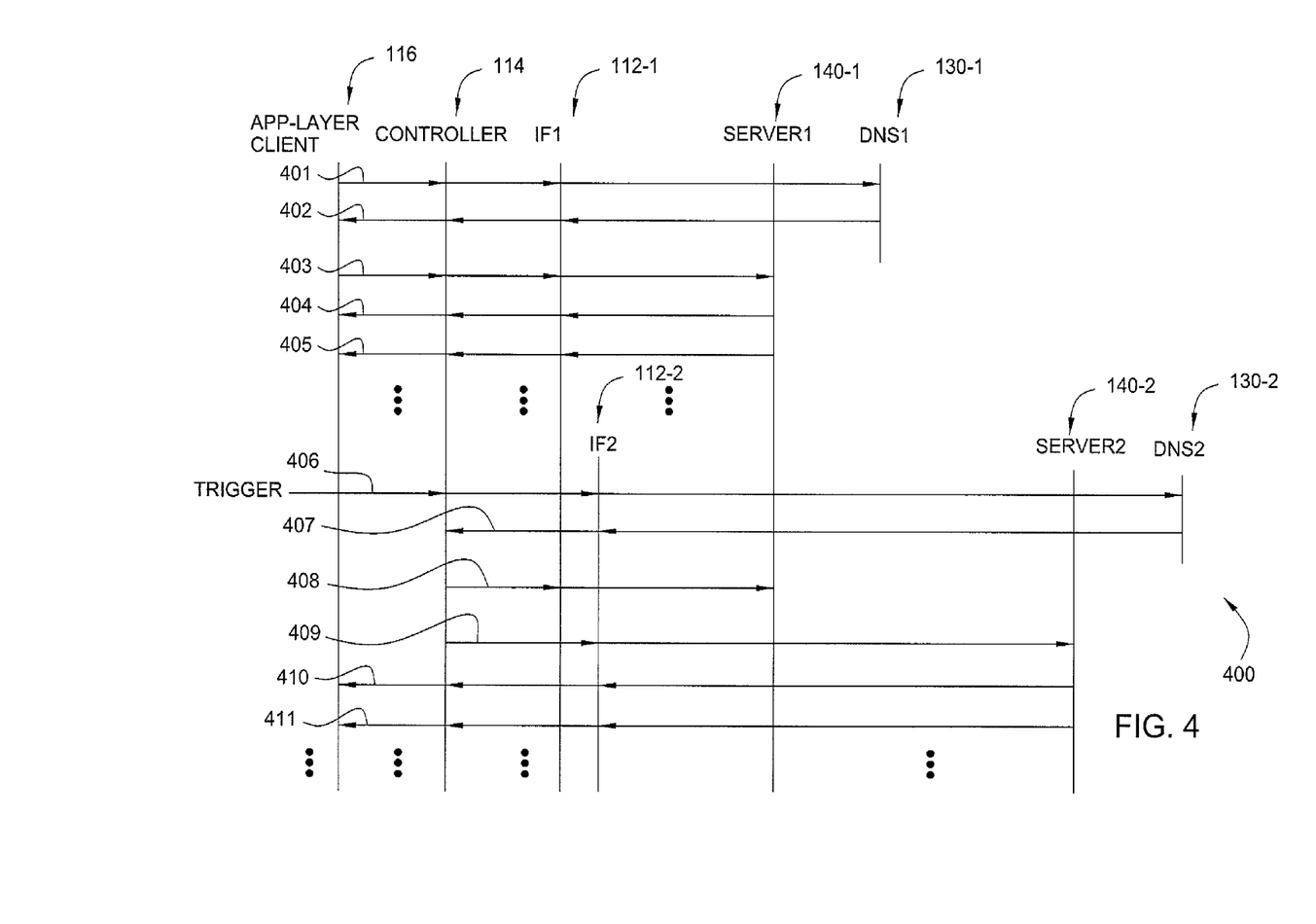
FIG. 4 depicts a protocol diagram illustrating a methodology according to one embodiment.

FIG. 4 depicts a protocol diagram illustrating a methodology according to one embodiment. Specifically, FIG. 4 depicts a method 400 wherein at each of a plurality of steps denoted as steps 401, 402 and so on up to (and optionally beyond) 411, information is depicted as being conveyed between various functional elements described above with respect to FIG. 1 to illustrate thereby the various embodiments.

At step 401, the client 116 sends a domain name server (DNS) request to the DNS 130-1 associated with the first network 120-1 via the first interface 112-1 (also denoted herein as IF1) to retrieve therefrom the IP address for the first content server 140-1. During this step, the controller 114 intercepts the DNS request and caches the uniform resource identifier (URI) associated with the DNS request. It will be appreciated by those skilled in the art that this process is not necessary within the context of an HTTP environment.

At step 402, the DNS server 130-1 propagates a DNS response back to the client 116. During this step, the controller 114 intercepts the response from the DNS server 130-1 and caches the returned IP addresses together with the URI of the request. It will be appreciated by those skilled in the art that this process is not necessary within the context of an HTTP environment.

At step 403, the client 116 initiates a transport session via the first interface 112-1 using the IP address of the first content server 140-1, and sends a content retrieval request. The controller 114 intercepts the setup request, identifies the URI of the content based on the remote IP address of the connection (not necessary for HTTP), caches the content request message sent by the client and starts monitoring this transport connection.

At step 404, the first content server 140-1 sends a response packet to the client 116 which contains a response header and, potentially, a first portion of the content data. The controller intercepts this packet and responsively starts tracking the content data forwarded to the client.

At step 405, the first content server 140-1 continues sending a stream of packets to the client containing additional portions of the requested content data. The controller intercepts these packets and continues tracking the content portions forwarded to the client.

At step 406, the interface manager 118 sends a trigger to the controller 114, illustratively, the IC signal path. The trigger indicates that the controller should switch from the first interface 112-1 to the second phase 112-2. In response to the trigger, the controller 114 sends a copy of the cached DNS request (or other indicator of the URI associated with the initial content request) to the second network 120-2 via the second interface 112-2. Alternatively, the controller 116 creates its own DNS request containing the URI it retrieved from the client's earlier content request message. Other modifications are also contemplated by the inventors.

At step 407, the second DNS server 130-2 responds to the DNS request received at step 406 by providing a set of IP addresses for servers within the second network 120-2 that are able to provide the desired content. The controller, in one embodiment, 114 selects an IP address from this set, which is depicted in FIG. 4 as referring to the second content server 140-2.

At step 408, the controller 114 terminates the transport connection between the first interface 112-1 and the first content server 140-1 via, for example, a TCP RST. Further, the controller 114 determines the aggregate amount of content the client has received via the original transport connection.

At step 409, the controller 114 establishes a new transport connection via the second interface 112-2 using the IP address associated with the second content server 140-2. Additionally, the controller 114 sends via this new transport connection a copy of the content retrieval request as well as an offset into the content retrieval request, which offset accounts for the amount of content that has already been retrieved via the old transport connection via the first interface 112-1.

At step 410, the second content server 140-2 sends a response packet to the controller 114 which includes a response header and, possibly, a first portion of the content data starting at the offset. The controller 114 removes the response header and forwards any received post-offset data portions to the client 116. The controller 114 also continues tracking the content data forwarded to the client. It is noted that since the client is unaware of the operation of the controller 114 and, in particular, the content request made by the controller 114, the corresponding response header is not expected by the client at this time and is therefore stripped away by the controller 114.

At step 411, the second content server 140-2 continues sending a stream of packets to the client 116 containing additional portions of the requested content data. The controller 114 intercepts these packets and continues tracking the content portions forwarded to the client.

Figure 5A:
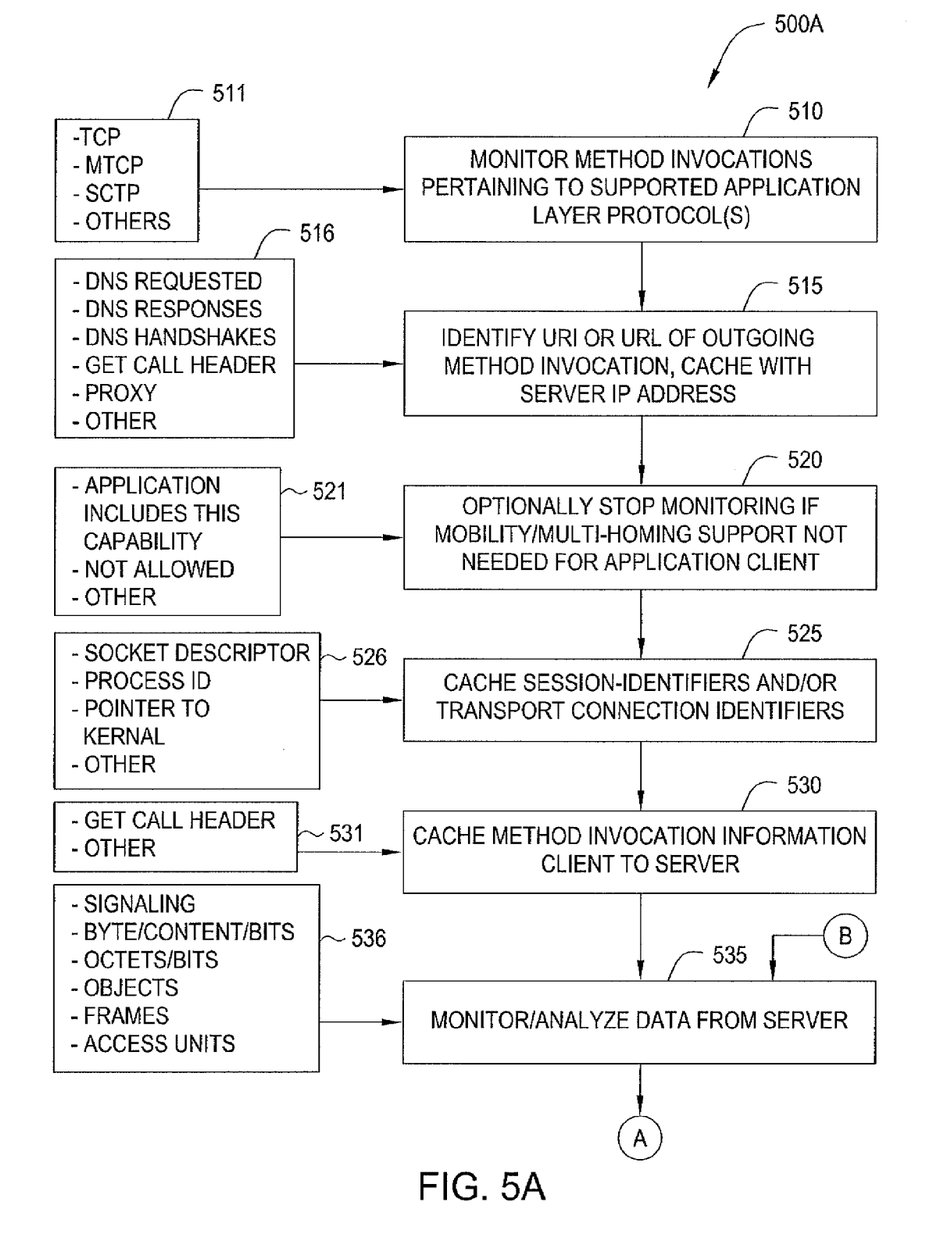
FIG. 5 depicts a flow diagram illustrating a methodology according to one embodiment.
Figure 5B:
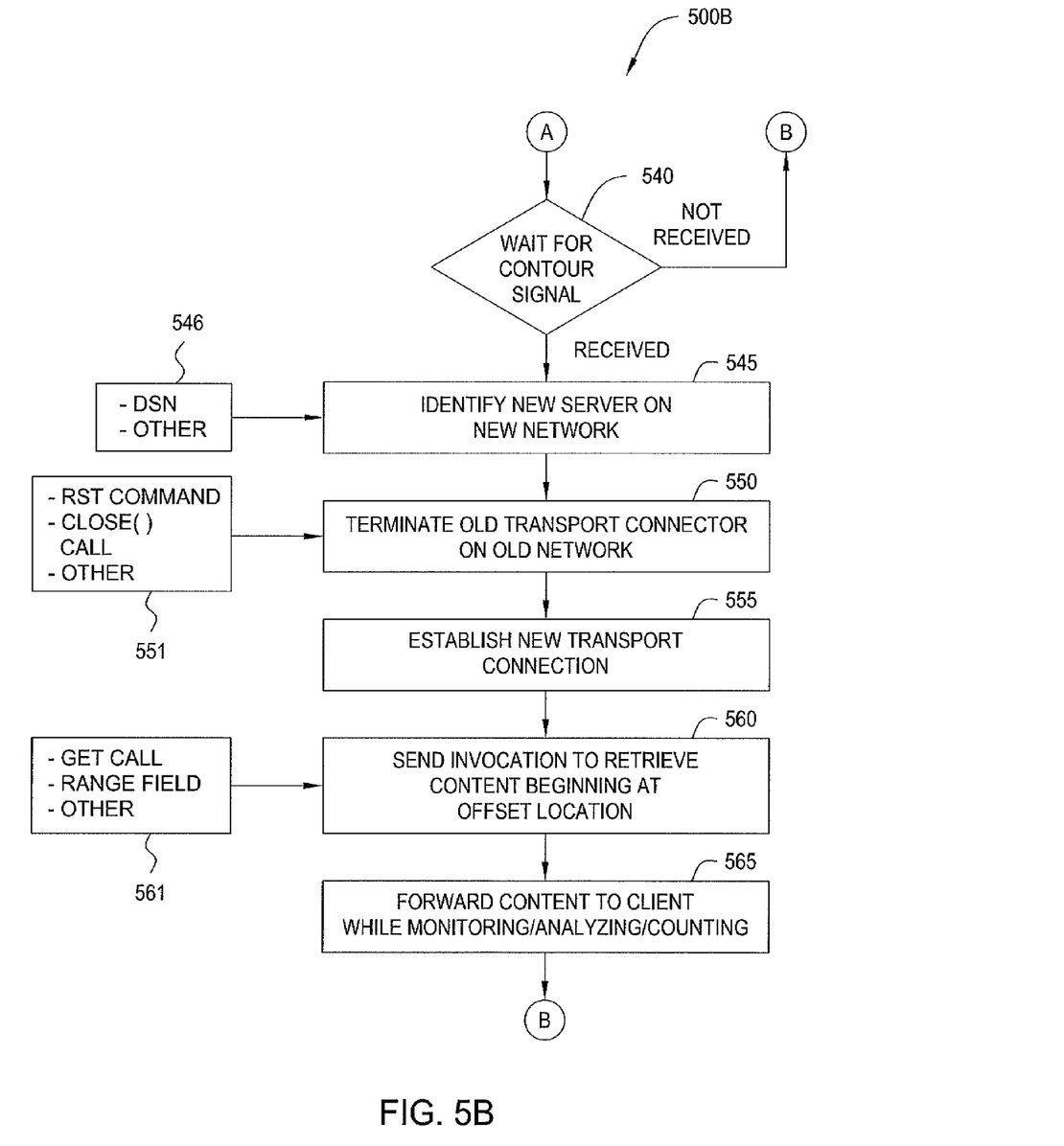

FIG. 5 depicts a flow diagram illustrating a methodology according to one embodiment. The methodology discussed herein with respect to FIG. 5 generally contemplates that HTTP is used as application-layer protocol, and that the HTTP GET method is used to request content. As discussed elsewhere, various other protocols may be implemented, as well as protocols on various other software layers.

Referring to step 510 and box 511, the controller monitors outgoing method invocations pertaining to the application layer protocol it supports. For implementations of the controller on the transport layer using TCP or MPTCP, the controller analyzes the first outgoing data packet after the SYN/ACK handshake initiated by the client. For SCTP, the first outgoing data packet after the INIT handshake has to be analyzed. For session layer implementations, the first data packet after the CONNECT( ) call has to be analyzed.

Referring to step 515 and box 516 the controller identifies the URI or URL that corresponds to the outgoing method invocation. This URI or URL is cached together with the IP address of the server used for content retrieval. In one embodiment, this is achieved by the controller monitoring DNS request/response handshakes initiated by the host and by caching the URI/URL of the DNS request together with the IP addresses contained in the DNS response. Based on these cached data and the destination address of the outgoing method invocation, the corresponding URI/URL of the method invocation may be found. In the case of HTTP being used as application-layer protocol, the URI/URL may be derived from the HTTP header contained in the GET call. In the case of an HTTP proxy being configured for an interface, the proxy may represent the content server.

Referring to step 520 and box 521, the controller may optionally stop monitoring if mobility/multi-homing support is not needed for the application client or not allowed for some reason. Specifically, when a content retrieval session has been identified via the above steps, the controller may further determine if this application-layer session requires support for mobility/multi-homing. This determination may involve external criteria, such as a number and type of interfaces supported by the host as well as other criteria. Within the context of the following controller functions, it is assumed that the content retrieval session requires such mobility/multi-homing support.

Referring to step 525 and box 526, the controller caches session-connection identifiers or transport-connection identifiers. These identifiers are used by the controller to deliver content data portions that are destined for the client application and arrive on future connections that were initiated by the controller. In the case of the controller function residing on the session layer, such an identifier can consist of the socket descriptor and process id used by the application. In the case of the controller function residing on the transport layer, such an identifier may be a pointer to the corresponding protocol control block in the kernel.

Referring to step 530 and box 531, the controller caches the information contained in the method-invocation call sent by the client application to the content retrieval server. If HTTP is the application-layer protocol, this information refers to the HTTP request header of the HTTP GET call.

Referring to step 535 and box 536, the controller monitors and analyzes all data sent by the content server in response to the client's method invocation. The controller determines the amount of content that has been received. In this process, the controller may have to discount signaling information provided by the application layer protocol, such as HTTP response headers.

In one embodiment, the content is specified in units of octets or bits. In another embodiment, the content is represented by a list of object identifiers. In another embodiment, the content is specified in terms of a number of axis units or frames received, such as for a video stream and/or audio stream. In another embodiment, the content is specified in terms of the time interval it would take to play the received fraction of a video stream (such as calculated using the code timestamps (DTS), presentation timestamps (PTS), program clock references (PCR) and the like).

Referring to step 540, the controller waits for a control signal from the interface manager to indicate that the interface used for content retrieval is to be changed. Until such time as a control signal is received, the controller continues to monitor and analyze the content portions received from the first content server 140-1 via the first interface 112-1.

Referring to step 545 and box 546, after receiving the interface change addictive control signal the controller identifies an appropriate server for content delivery on the new interface. For that purpose the controller may initiate a DNS request on the new interface containing the URI mapped to the initial method invocation by the client application. If the DNS response does not contain the IP address of the old content server, it may be advisable to use a new content server. If HTTP is used as application layer protocol and an HTTP proxy was used on the old interface, it may be advisable to use a new content server for the new interface. If the new interface is configured with an HTTP proxy, the HTTP proxy itself may take the function of the content server to the client. In the following, we refer to "old server" and "new server" with respect to the respective old and new interfaces. The old and the new server may be identical, different and/or refer to proxy servers.

Referring to step 550 and box 551, the controller terminates the old transport connection to the old server. In case the host can only support one interface at a time, this step is performed before the step of identifying an appropriate server for content delivery on the new interface. If the controller is implemented on transport layer and TCP is used as transport protocol, the controller can send an RST command to terminate the connection. For this purpose, the controller needs to know the transport connection identifier. If the controller is implemented on session layer, it can close the connection via a CLOSE( ) call. For this purpose, the controller needs to know the socket descriptor and eventually the process identifier.

Referring to step 555, the controller establishes a new transport connection via the new interface with the new server. In embodiments where the controller function resides on transport layer, it may advantageously use the same protocol control block. However, it has to undergo the connection-setup signaling handshake with the new server via the new interface. This guarantees that further content data delivered by the new content server may be forwarded to the same client application. In embodiments where the controller resides on the session layer, content data portions received from the new content server are forwarded to the same socket descriptor on the same application layer process.

Referred to step 560 and box 561, the controller sends the cached method invocation to the new server on the new transport connection. The controller inserts an instruction containing the offset which allows the content server to omit delivery of the amount of content data that have already been received. This instruction is specific to the application layer protocol. For HTTP, the RANGE command may be used which has to be inserted into the HTTP request header together with the amount of octets of content that have already been received.

Referring to step 565, the controller forwards all content received on the new connection to the client application. For this purpose, it uses the session-connection or transport-connection identifiers it cached for this content retrieval session. On the new connection, the counting of passing content data portions continues so that further connection migration events may be performed. In various embodiments, the operations at step 565 are similar to those discussed above with respect to step 535 and box 536.

Figure 6:
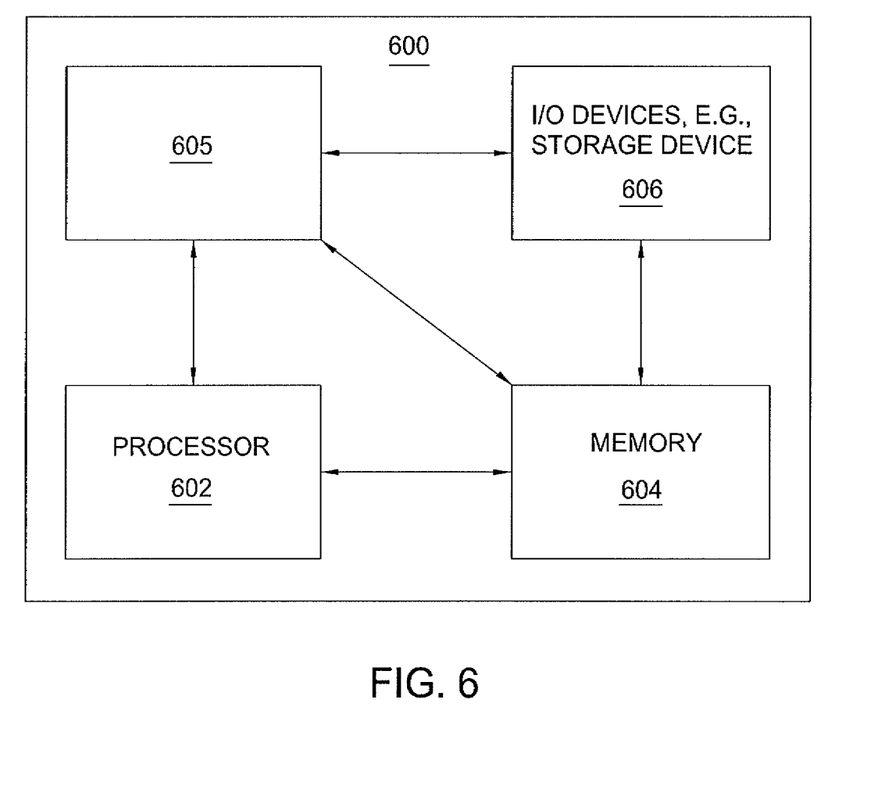
FIG. 6 depicts a high-level block diagram of a computer suitable for use in performing the functions described herein.

FIG. 6 depicts a high-level block diagram of a computer suitable for use in performing functions described herein.

As depicted in FIG. 6, computer 600 includes a processor element 602 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 605 may be loaded into memory 604 and executed by processor 602 to implement the functions as discussed herein. Thus, cooperating process 605 (including associated data structures) may be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein and/or portions of functional elements described herein. For example, the computer 600 provides a general architecture and functionality suitable for implementing one or more of the host 110, content servers 140, domain name servers 130 and/or portions thereof and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

The various embodiments provide significant benefits. Specifically, systems, apparatus and methodologies based upon the various embodiments may be directly integrated into the feature set of so-called smart phones. Such integration may occur within the native hardware/software feature set or mobile phone platform provided by phone manufacturers (e.g., Apple, Motorola, HTC, Samsung, Research In Motion, LG, Nokia and the like) or operating system vendors (e.g., Apple, Google, Microsoft and the like). Integrated features according to the various embodiments provide an efficient mechanism to perform the various functions described herein and offer product differentiation to the various hardware and software vendors.

The various embodiments discussed herein are easily adapted by mobile phone or mobile OS vendors since (1) multi-homing has become a ubiquitous feature on smart phones, (2) there are many heterogeneous network scenarios (Wi-Fi overlaying 3G/4G) where networks are operated by different service providers, (3) no specialized network-side equipment is needed and (4) no upgrade on the server is needed. The invention therefore adds value to the phone or mobile OS without depending on any third party investment.

Advantageously, the various embodiments permit mobility or interface migration across networks and access providers for, illustratively, HTTP-based content retrieval applications. These applications represent the majority of mobile internet traffic.

Various embodiments provide these features in a manner transparent to applications, such that legacy applications and the like can then affect therefrom. Various embodiments also provide these features in a manner transparent to access providers, such that there is no need for any specialized network-side equipment such as mobility anchors and the like.

Further, remote content servers do not require any protocol upgrade as long as the application layer protocol contains an offset description in the content request message. This condition is met for HTTP and similar protocols.

Further, the content server can also be changed during mobility/interface-migration, which allows using the optimum server for each network selected. This feature also allows operation in presence of proxies that exist in some networks, e.g. enterprise networks. Hence, in various embodiments, support is provided for session migrations between an enterprise network and a mobile network operator's network.

Although various embodiments which incorporate the teachings of the present invention have been shown and described in detail herein, those skilled in the art can readily devise many other varied embodiments that still incorporate these teachings.

What is claimed is:

1. A method for migrating a content retrieval session associated with a content retrieval application at a host from a first server to a second server, the method comprising:
    establishing a transport connection with the first server using a first network interface associated with a first network;
    caching a first content request message transmitted toward the first server via the first network interface;
    monitoring content received from the first server via the first network interface to determine an amount of content received by the content retrieval application via the first network interface;
    establishing a transport connection with the second server using a second network interface associated with a second network; and
    transmitting, toward the second server via the second network interface, a second content request message determined based on the cached first content request message and the determined amount of content received by the content retrieval application via the first network interface, wherein the second content request message comprises information from the cached first content request message and an instruction configured to instruct the second server to omit delivery of the amount of content received by the content retrieval application via the first network interface;
    wherein the first network interface and the second network interface are different.

2. The method of claim 1, wherein the content is propagated via an application layer protocol, wherein monitoring the content received from the first server via the first network interface to determine the amount of content received by the content retrieval application via the first network interface comprises discounting signaling information associated with delivery of the content from the first server via the first network interface.

3. The method of claim 1, wherein the amount of content received by the content retrieval application via the first network interface is represented using at least one of:
- an amount of octets or bits of content received by the content retrieval application via the first network interface;
- a byte count of bytes of payload representing content data portions that have been delivered via the first network interface and acknowledged;
- a list of object identifiers;
- a number of frames received; or
- a time interval it would take to play the content received by the content retrieval application via the first network interface.

4. The method of claim 1, wherein the instruction comprises an offset indicative of the determined amount of content received by the content retrieval application via the first network interface.

5. The method of claim 4, wherein the offset comprises one of:
- an amount of octets or bits of content received by the content retrieval application via the first network interface;
- a byte count of bytes of payload representing content data portions that have been delivered via the first network interface and acknowledged;
- a list of object identifiers;
- a number of frames received; or
- a time interval it would take to play the content received by the content retrieval application via the first network interface.

6. The method of claim 1, wherein the second content request message comprises a Hypertext Transfer Protocol (HTTP) GET message, wherein the instruction comprises an HTTP RANGE command including an amount of octets of content received by the content retrieval application via the first network interface.

7. The method of claim 1, further comprising:
- intercepting a domain name server (DNS) request sent toward a DNS server, the DNS request comprising a uniform resource identifier (URI) or uniform resource locator (URL) of the requested content;
- caching the URI or the URL of the requested content;
- intercepting a DNS response from the DNS server, the DNS response including an IP address of the first server; and
- caching the IP address of the first server in a manner for associating the IP address of the first server with the cached URI or URL of the requested content.

8. The method of claim 1, further comprising:
- detecting a request to switch from the first network interface to the second network interface;
- propagating, toward a domain name server (DNS), a DNS request comprising a uniform resource identifier (URI) or uniform resource locator (URL) of the requested content;
- intercepting a DNS response from the DNS server, the DNS response including an IP address of the second server; and
- caching the IP address of the second server in a manner for associating the IP address of the second server with the cached URI or URL of the requested content.

9. The method of claim 1, further comprising:
- monitoring outgoing method invocations associated with a supported application layer protocol; and
- identifying a uniform resource identifier (URI) or uniform resource locator (URL) associated with an outgoing method invocation and caching an association of the URI or the URL to an Internet Protocol (IP) address of the first server.

10. The method of claim 9, wherein monitoring outgoing method invocations associated with the supported application layer protocol comprises at least one of:
- for monitoring performed at a transport layer using a Transmission Control Protocol (TCP), analyzing a first outgoing data packet after a SYN/ACK handshake;
- for monitoring performed at a transport layer using a Stream Control Transmission Protocol, analyzing a first outgoing data packet after an INIT handshake; or
- for monitoring performed at a session layer, analyzing a first outgoing data packet after a CONNECT( ) call.

11. The method of claim 9, wherein identifying the URI or URL associated with the outgoing method invocation and caching the association of the URI or the URL to the IP address of the first server comprises:
- intercepting a domain name server (DNS) request sent toward a DNS server, the DNS request comprising the URI or the URL of the requested content;
- caching the URI or the URL of the requested content;
- intercepting a DNS response from the DNS server, the DNS response including an IP address of the first server; and
- caching the IP address of the first server in a manner for associating the IP address of the first server with the cached URI or URL of the requested content.

12. The method of claim 1, further comprising:
- identifying the second server based on a domain name server (DNS) location service.

13. The method of claim 12, wherein a uniform resource indicator (URI) or a uniform resource locator (URL) used for a DNS request for the DNS location service is derived from at least one of a prior DNS request sent by the host or the first content request message.

14. The method of claim 1, further comprising:
- suppressing further delivery of content from the first server.

15. The method of claim 14, wherein Transmission Control Protocol (TCP) is used as a transport mechanism, wherein suppressing further delivery of content from the first server comprises transmitting a TCP RST message toward the first server via the first network interface.

16. The method of claim 1, further comprising:
- analyzing a content bearing data stream received via the second network interface of the host to identify further content portions received by the content retrieval application via the second network interface; and
- forwarding, toward the content retrieval application, identified content portions not received by the content retrieval application via the first network interface.

17. The method of claim 1, wherein the first and second servers comprise the same server.

18. An apparatus for migrating a content retrieval session associated with a content retrieval application at a host from a first server to a second server, the apparatus comprising:
- a processor and a memory communicatively connected to the processor, the processor configured to:
  - establish a transport connection with the first server using a first network interface associated with a first network;
  - cache a first content request message transmitted toward the first server via the first network interface;
  - monitor content received from the first server via the first network interface to determine an amount of content received by the content retrieval application via the first network interface;

establish a transport connection with the second server using a second network interface associated with a second network; and transmit, toward the second server via the second network interface, a second content request message determined based on the cached first content request message and the determined amount of content received by the content retrieval application via the first network interface, wherein the second content request message comprises information from the cached first content request message and an instruction configured to instruct the second server to omit delivery of the amount of content received by the content retrieval application via the first network interface;

wherein the first network interface and the second network interface are different.

19. A non-transitory computer-readable storage medium storing instructions which, when executed by a computer, cause the computer to perform a method for migrating a content retrieval session associated with a content retrieval application at a host from a first server to a second server, the method comprising:

establishing a transport connection with the first server using a first network interface associated with a first network;

caching a first content request message transmitted toward the first server via the first network interface;

monitoring content received from the first server via the first network interface to determine an amount of content received by the content retrieval application via the first network interface;

establishing a transport connection with the second server using a second network interface associated with a second network; and transmitting, toward the second server via the second network interface, a second content request message determined based on the cached first content request message and the determined amount of content received by the content retrieval application via the first network interface, wherein the second content request message comprises information from the cached first content request message and an instruction configured to instruct the second server to omit delivery of the amount of content received by the content retrieval application via the first network interface;

wherein the first network interface and the second network interface are different.

* * * * *